Patented May 14, 1935

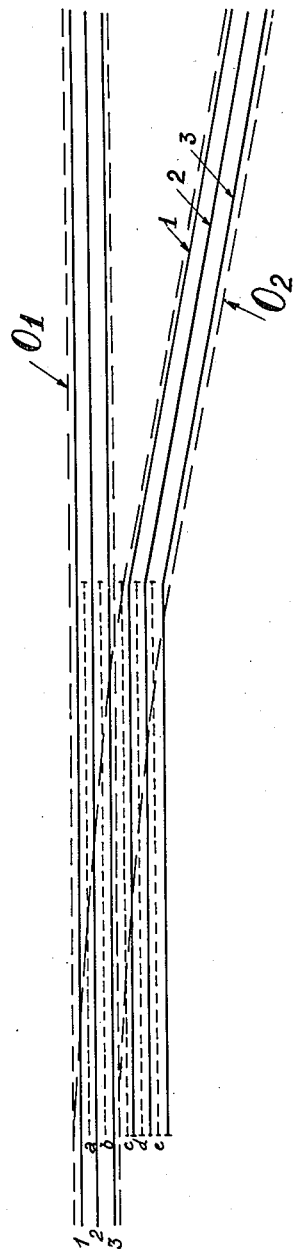
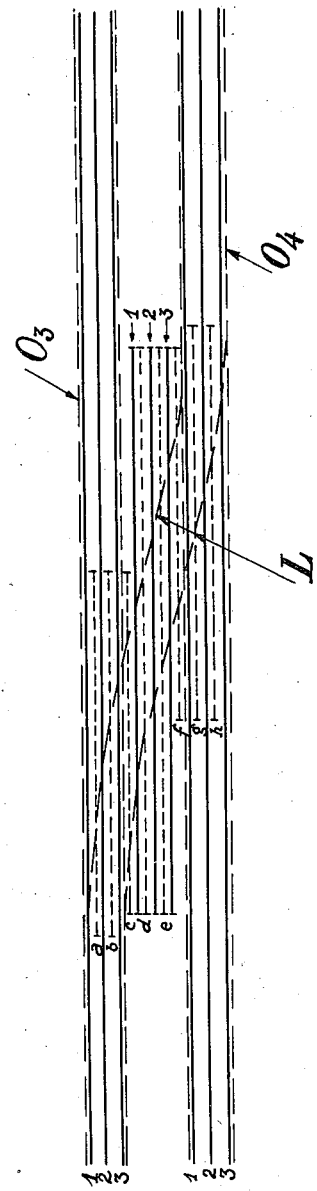

2,001,357

UNITED STATES PATENT OFFICE 2,001,357

ELECTRIC TRACTION

Edouard Guignard, Paris, France, assignor to Société Parisienne pour l'Industrie des Chemins de Fer et des Tramways Electriques, Paris, France, a French joint-stock company Application July 27, 1933, Serial No. 682,515
In France August 10, 1932

8 Claims. (Cl. 191—33)

The present invention consist of a novel kind of arrangement of electric trolley wires or overhead conductors for electrically driven vehicles and of a special method of collecting electric current from the conductors so arranged, the electric vehicles being of any type, whether travelling on roads, rails or canals, or suspended. The vehicles may even be of the "aeroplane" type; in this case the electrically driven vehicles travel above the ground, along a purely electric conductor system, without any means for their suspension.

The electric current for the trolley wires or conductors arranged according to the invention may be as desired; continuous, single or polyphase alternating current of high or of low tension.

In principle, the method of collection according to the invention resides in the use of current collectors comprising sliding contacts or shoes mounted either on one or more independent trolley poles, or on one or more bows, pantographs or the like.

According to the invention, the arrangement of the trolley wires, with simple or catenary suspension, consists in constituting these trolley wires for each line of vehicles (whether of road, rail or canal traction, suspension or aeroplane type) by as many live conductors as the nature of the current requires, viz. two for continuous current or single-phase alternating current, three for three-phase current, or $n$ for polyphase current of $n$ phases, with insulated or non-conducting "dead" wires installed on each side of the live conductors, so that the whole forms an actual web over or along which the trolley shoes or sliding contacts provided on the driven vehicles can move, the number of these shoes or sliding contacts also corresponding to the nature of the current employed, two for continuous or singe-phase alternating current, three for three-phase alternating current, or $n$ for polyphase current.

The invention is hereafter described with reference to the accompanying drawings, in which:—

Figures 3 and 4 are diagrams in plan view of details in the application to rail or tramway traction.

Figure 1:
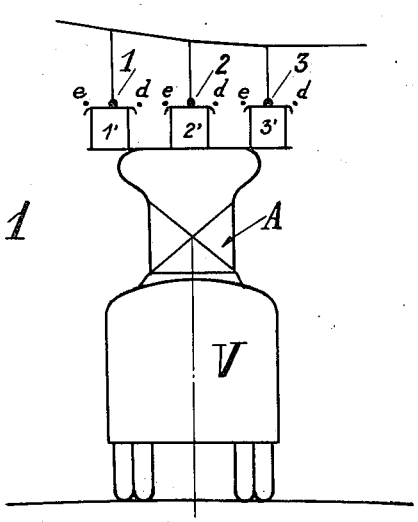
Figure 1 represents in elevation an example of the application of the invention to a three-phase supply trolley wire system for road vehicles.

Referring to Figure 1, the three main trolley-wires or conductors are indicated as 1, 2, 3; the vehicle V is likewise provided with three sliding contacts 1', 2', 3', mounted upon a bow A. The trolley wire system further comprises intermediate dead wires $d$ $e$, not receiving current, arranged respectively on opposite sides of the conductor wires 1, 2, 3 and parallel to the latter, so that such wires $d$ $e$ are found between two adjacent conductors and outside the lateral conductors, the whole system of trolley wires constituting a substantially horizontal web. Each of the wires $d$ $e$ is composed of a series of sections insulated from each other and their grouping allows the trolley shoes or sliding contacts to pass from one conductor wire to another without risk of putting the line out of action by the contacts catching over the wires. If the wires $d$ $e$ are made of insulating material, it is naturally unnecessary to arrange them in insulated lengths.

In a general manner, the dimensions of each trolley shoe or sliding contact are determined in such a way that this contact cannot connect electrically two adjacent conductors. On the other hand, the number of wires not receiving current, their position in relation to the adjacent conductors, and the length of the insulated sections (assuming that these wires are made of conducting material) are calculated in such a way that the sliding contacts of two or more vehicles cannot at any time occasion a short-circuit between two wires of different polarity in any of the sections provided.

It will be understood that a single dead intermediate wire between two adjacent conductors of different polarity might be sufficient from the point of view of the mechanical upkeep of the line and would give equal satisfaction from the electrical joint of view, if it were assured that only one vehicle would ever be travelling in one insulated section of the said intermediate wire.

In the case of a single intermediate wire between adjacent conductors, it might be arranged in insulated sections each extending from one cross-span or bracket supporting the trolley wires to another support, and no vehicle would then be allowed to enter a section already occupied by a vehicle preceding it in the same direction.

The adoption of two or three intermediate wires not receiving current between adjacent conductors, allows the simultaneous passage of two or three vehicles respectively in each insulated section, it being understood that the transverse length of the trolley shoes or contacts is very little greater than the spacing of two adjacent wires, whether conductors or not.

In the case where the wires intermediate of the conductors are made of suitable insulating material, a single intermediate wire will be sufficient to allow the simultaneous passage of any desired number of vehicles along a trolley wire system having two or more conductors.

When applying the invention to the different cases enumerated above, the following characteristics are to be noted:—

(1) Traction upon roads or canals.

Above the road or canal and approximately parallel to its sides, there is arranged a complete overhead supply system in accordance with the invention, to suit the line of travel of each file of vehicles; this overhead system may comprise as many conductor wires as are necessary, each conductor wire being accompanied by the intermediate and lateral wires not receiving current, as explained above. Two or more series of conductor or trolley wires may be spaced or distributed in such a way that the web or network thus constituted allows the collection of the current without interruption from one side to the other of the road or canal.

Figure 2:
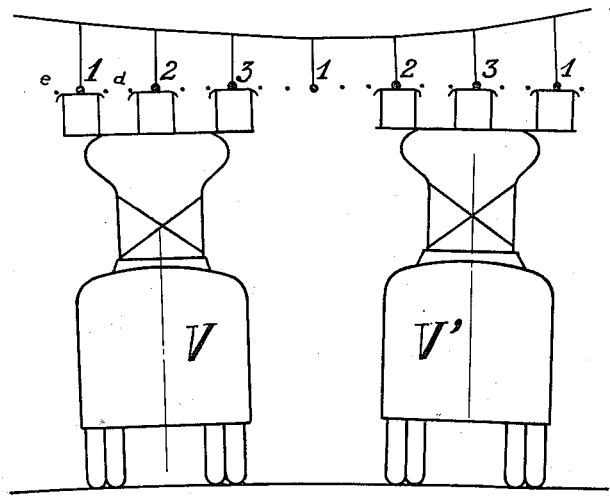
Figure 2 represents another example of a three-phase supply system for a road wide enough for the passage of two vehicles.

For example, see Figure 2 of the drawings, if the width of the road upon which the vehicles V V' travel should require seven conductor wires, that is two series of three and an additional one, in the case of power supply with three-phase current, these wires would succeed one another in the order 1, 2, 3, 1, 2, 3, 1, corresponding to the phases of current, together naturally with the intermediate wires e d not receiving current.

It will be understood that due to this arrangement, the direction of rotation of the three-phase motors employed upon the vehicles is in no way affected by the position of the vehicle in relation to the contact web.

The equipment of such an aerial network or web allows therefore the displacement of a vehicle in either direction and at any point in the line of travel, as well as the crossing and overtaking of the vehicles, their passage from one side to the other of the road, and so on, provided however that the angle of deviation shall not be sufficient for the trolley shoes or sliding contacts to escape from the parallel wires of the web by assuming an oblique position allowing them to slip upwards between two consecutive wires.

In order to enable the vehicles to turn round, when necessary, the current collectors upon the vehicles will be provided with a suitable unlatching device, allowing the collectors to pivot around a vertical axis through an angle equal to that by which the vehicle is to turn. For this purpose there might be provided for example a gyroscope or any other suitable device in order to maintain the bow or pantograph carrying the sliding contacts in a given position in relation to the overhead system during the whole duration of the turn.

(2) Traction of suspended vehicles.

When the vehicles are suspended from girders, cables or any other suitable means, the conductor system constituted in the same manner as already described for traction upon roads or canals is then arranged below the vehicle, which carries on its underside the one or more current collectors with sliding contacts or shoes.

(3) Traction of vehicles of the aeroplane type.

The invention allows the use of electrically driven vehicles borne upon wings like an aeroplane. The installation of the conductor system, now forming an aerial track, still remains the same and the aeroplane-type vehicle with its electric driving motor or motors is provided with suitable sliding contacts or shoes to collect the current.

At the beginning of the track, the aeroplane-type vehicle is brought into proximity to the web forming the conductor system, against which the current collectors press, either by supporting it upon launching ways, or by inclining the web constituting the conductor system downwards for that purpose at this point.

After the start, the aeroplane-type vehicle arranged so as to have a sufficient angle of climb, then presses automatically against its conductor system so that its sliding contacts or shoes collect the current for its motor or motors exactly in the same way as for an ordinary vehicle.

(4) Traction on railways.

Three-phase electric traction upon railways with three trolley wires and three current collectors has not hitherto been generally applied, especially because of the complexity of the arrangements at junctions.

The invention need not be applied as a whole on plain lengths of track where a three-phase conductor system can be provided without requiring insulated intermediate wires, by reason of the fixity of the bows or pantographs which prevent any possibility of the shoes or contacts leaving the trolley wires, but the application of the invention in the vicinity of junction points offers important advantages.

It suffices in fact to equip the parts of the trolley wires or conductors in the vicinity of the junctions in the manner indicated above, that is to say with intermediate wires not receiving current and to mount above the turn-out an identical network parallel to the main track; the branch line will then be equipped like the normal main track.

Figure 3 of the accompanying drawings represents a turn-out of this kind; 1, 2, 3 are the three-phase conductors of the overhead system for the main track $O_1$ and for the branch line $O_2$. Over a sufficient length adjacent to the points the two overhead systems lie parallel and constitute a web or network provided with intermediate wires $a$ $b$ $c$ $d$ $e$ not receiving current.

In the case of a cross-over between two parallel tracks, it may happen that the distance of the centres of these tracks allows of fitting between the overhead systems of the two tracks, that is to say above the actual cross-over L, a similar overhead system of short length, in such a way as to obtain equal spacing of all the wires in the web or network thus formed.

This case is represented in Figure 4, in which 1, 2, 3 are the three-phase conductors of the overhead systems; $a$ $b$ $c$ $d$ $e$ $f$ $g$ $h$ are the intermediate wires not receiving current, of sufficient length to guide the contact shoes or collectors over the crossing.

If the spacing of the parallel tracks $O_3$ $O_4$ is greater, it is sufficient to reproduce above each of the connecting points or switches the arrangement illustrated in Figure 3.

It has been mentioned already that the electric current for the overhead supply system forming the subject of the present invention can be of any kind but it will be appreciated that there is great advantage in the utilization of three-phase current of any voltage, whatever be the system of electric traction considered. This will facilitate the development of the applications of such current without the use of special sub-stations, since the novel supply systems or trolley lines arranged in accordance with the invention could be fed directly from existing power-transmission lines at the voltages normally employed, for example supplies of three-phase current at 3000 to 15000 volts, at 50 periods per second.

These overhead supply or trolley lines could themselves be considered as forming power-transmission lines which would offer great advantages as regards the distribution of electrical energy.

What I claim is:—

1. A trolley-wire system for collector-fitted electric traction vehicles having an indefinite path, comprising a plurality of parallel wires including conductors connected to respective poles of a source of supply, and dead wires spaced intermediately between and laterally of said conductors, said dead wires being spaced from the adjacent conductors and from each other a distance less than the width of the collector adapted to take current from each conductor, and said wires constituting a substantially horizontal web extending in the direction of travel.

2. A trolley-wire system for collector-fitted electric traction vehicles having an indefinite path, comprising parallel wires including a plurality of conductors connected to respective poles of a source of supply, and a plurality of dead wires spaced intermediately between said conductors, said dead wires including insulating material and being spaced from the adjacent conductors and from each other a distance less than the width of the collector adapted to take current from each conductor, and the whole of said parallel wires constituting a substantially horizontal web extending in the direction of travel.

3. A trolley-wire system for collector-fitted electric traction vehicles having an indefinite path, comprising parallel wires including a plurality of conductors connected to respective poles of a source of supply, and a plurality of dead wires spaced intermediately between and laterally of said conductors, said dead wires being arranged in lengths insulated from one another and being spaced from the adjacent conductors and from each other a distance less than the width of the collector adapted to take current from each conductor, and the whole of said parallel wires constituting a substantially horizontal web extending in the direction of travel.

4. A trolley-wire system for collector-fitted three-phase electric traction vehicles having an indefinite path, comprising parallel wires including three conductors connected to respective phases of a three-phase source of supply, and a plurality of dead wires spaced intermediately between said conductors, said dead wires being spaced from the adjacent conductors and from each other a distance less than the width of the collector adapted to take current from each conductor, and the whole of said parallel wires constituting a substantially horizontal web extending in the direction of travel.

5. A trolley-wire system for collector-fitted three-phase electric traction vehicles having an indefinite path, comprising parallel wires including more than one series of three conductors connected in turn to respective phases of a three-phase source of supply, and a plurality of dead wires spaced intermediately between said conductors, said dead wires being spaced from the adjacent conductors and from each other a distance less than the width of the collector adapted to take current from each conductor, and the whole of said parallel wires constituting a substantially horizontal web extending in the direction of travel.

6. In electric traction for vehicles having an indefinite path, the combination of a trolley-wire system comprising parallel wires including conductors connected to respective poles of a source of supply, and dead wires spaced intermediately between and laterally of said conductors, and a vehicle driven by current from said trolley-wire system, said vehicle having collector shoes travelling in contact with said conductors and dead wires, said dead wires being spaced from the adjacent conductors and from each other a distance less than the width of the collector adapted to take current from each conductor and each of said shoes collecting current from only one of said conductors at a time during travel along said trolley-wire system.

7. In polyphase electric traction upon rails, a trolley-wire system comprising parallel conductors connected to respective phases of a polyphase source of supply, and additional conductors mounted beside said parallel conductors in the vicinity of a turn-out, with dead wires spaced intermediately between all said conductors, said dead wires being spaced from the adjacent conductors and from each other a distance less than the width of the collector adapted to take current from each conductor and all said conductors and dead wires constituting a substantially horizontal web extending over the length of the turn-out.

8. In polyphase electric traction upon rails, a trolley-wire system comprising a group of parallel conductors connected to respective phases of a polyphase source of supply and extending along one rail-track, a second group of parallel conductors connected to respective phases of said polyphase source and extending along a second rail-track beside the first, an additional group of conductors connected to respective phases of said polyphase source and extending between said first and second mentioned groups of conductors in the vicinity of a crossing from the first to the second track, and dead wires spaced intermediately between all said conductors to constitute a substantially horizontal web extending over the length of the crossing, said dead wires being spaced from the adjacent conductors and from each other a distance less than the width of the collector adapted to take current from each conductor.

EDOUARD GUIGNARD.